Feb. 24, 1970   E. W. FERDIG   3,496,611
MOLD FOR FORMING ROLLER ASSEMBLIES AND THE LIKE
Original Filed July 19, 1965   4 Sheets-Sheet 1

INVENTOR.
EARL W. FERDIG
BY Christie, Parker & Hale
ATTORNEYS

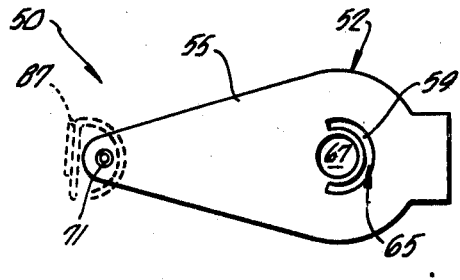
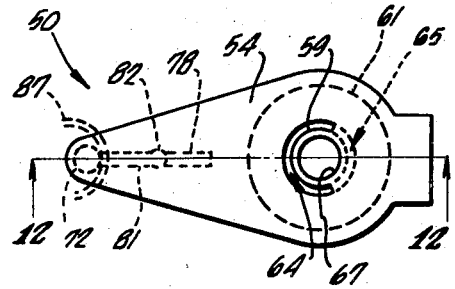
FIG_8    FIG_9
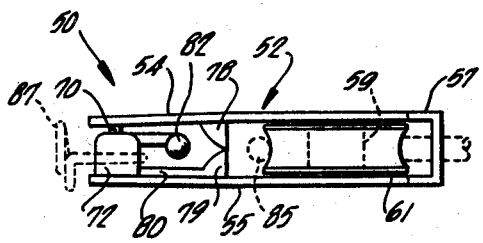
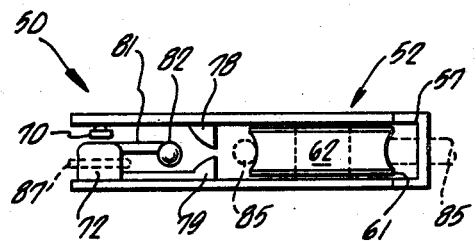
FIG_10    FIG_11
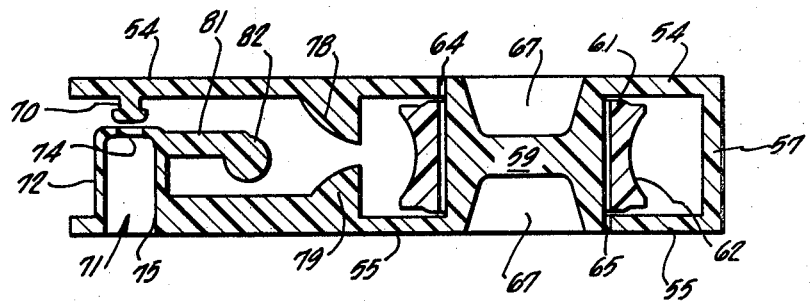
FIG_12

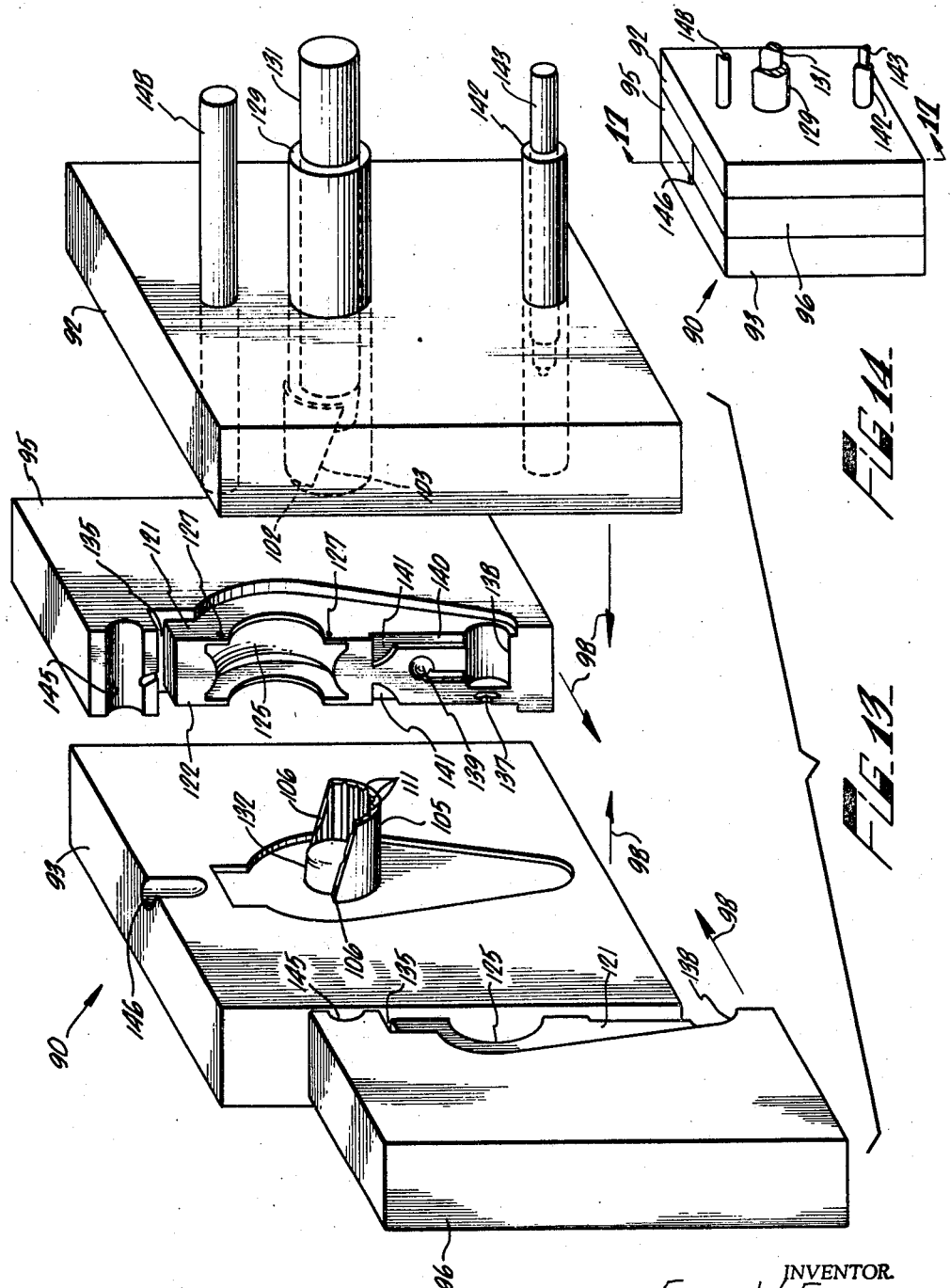

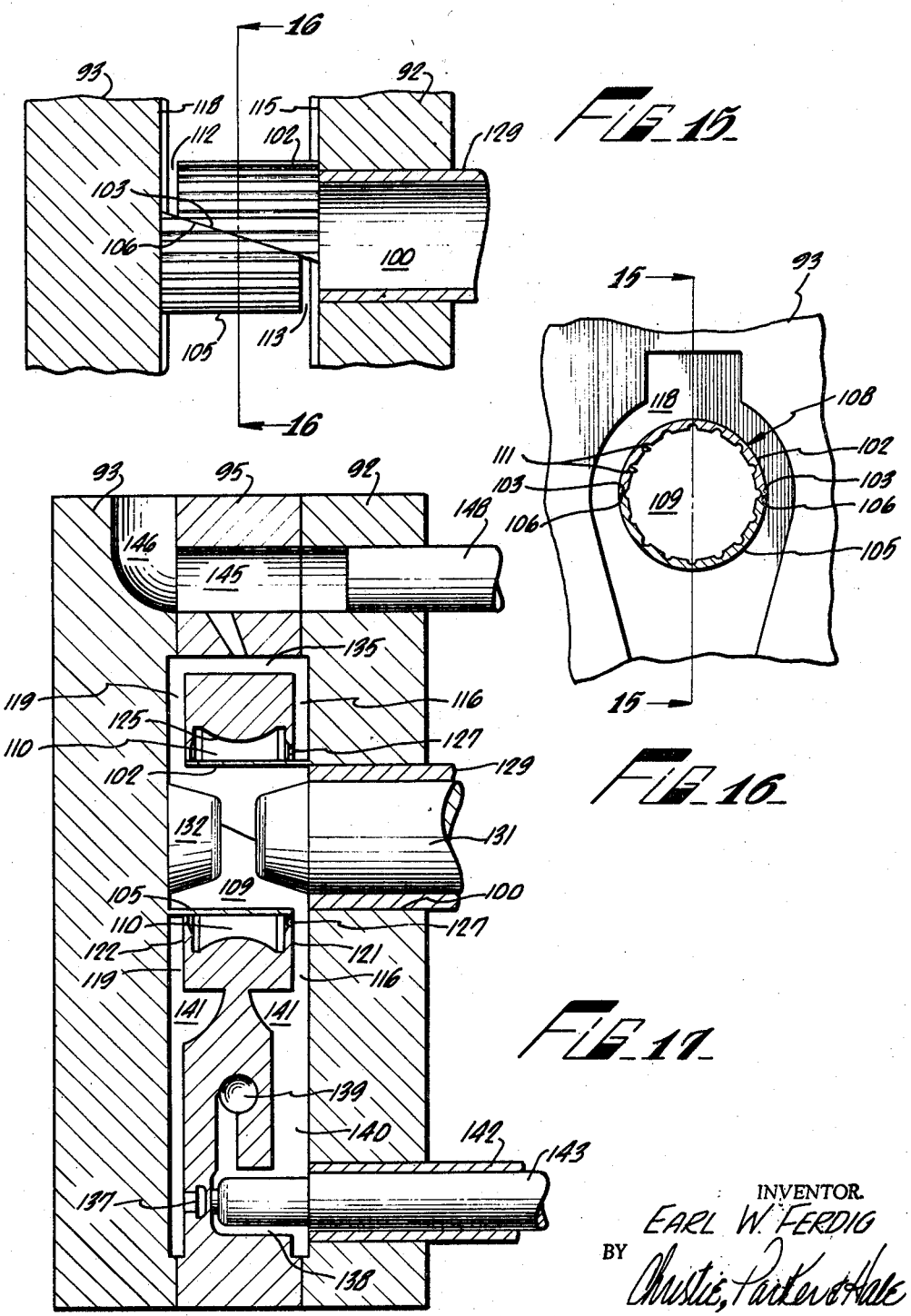

United States Patent Office 3,496,611
Patented Feb. 24, 1970

3,496,611
MOLD FOR FORMING ROLLER ASSEMBLIES AND THE LIKE
Earl W. Ferdig, Burbank, Calif., assignor to George F. McMurray, Burbank, Calif.
Original application July 19, 1965, Ser. No. 473,051, now Patent No. 3,378,233, dated Apr. 16, 1968. Divided and this application Dec. 18, 1967, Ser. No. 691,480
Int. Cl. B29f 1/00
U.S. Cl. 18—42          7 Claims

ABSTRACT OF THE DISCLOSURE

A mold for forming a roller assembly having a ribbed shaft, a pair of slotted flanges integrally formed on opposite ends of the shaft, and a member such as a roller which is captively and movably mounted on the shaft between the flanges. The mold includes a pair of spaced-apart blocks each having a shell extending toward and terminating short of the other block. The shells overlap and seat on each other to define a shaft cavity therebetween. A pair of inserts are positioned between the blocks and around the seated shells to define a movable-member cavity around the shaft cavity and a pair of flange cavities connected to and extending transversely from opposite ends of the shaft cavity.

CROSS-REFERENCE TO RELATED APPLICATIONS

This is a division of my co-opending application Ser. No. 473,051 filed July 19, 1965, now Patent No. 3,378,233, and is related to the apparatus disclosed in my U.S. Patents No. 3,206,992 issued Sept. 21, 1965 and No. 3,255,997 issued June 14, 1966, and my co-pending application Ser No. 423,145 filed Jan. 4, 1965, now Patent No. 3,362,675.

BACKGROUND OF THE INVENTION

Roller assemblies are used in many different forms and in many different applications. They may take the form of wheels, pulleys, bearings, etc. Such assemblies typically include a roller, a shaft or axle through the roller, and a pair of flanges or sidewalls secured to opposite ends of the shaft for retaining the roller on the shaft and for providing a convenient means for mounting the roller assembly to another structure.

Roller assemblies have typically been produced in the past by separately fabricating the several component parts, which are then assemblied in an additional production step. The additional step is time consuming and expensive, and it is desirable to fabricate the entire roller assembly in a single production step in order to meet the widespread demand for low-cost roller assemblies.

This goal has been partially met by the roller assemblies described in my aforementioned U.S. Patents 3,206,992 and 3,255,997. These patents described plastic roller assemblies which are molded in a single production step, the units emerging from the mold in ready-to-use condition. That is, a free-spinning roller is formed around a shaft having flanges to make the roller captive on the shaft, the entire assembly being formed in a single molding operation.

These molded roller assemblies have proved highly satisfactory in many applications. There remains, however, a demand for roller assemblies incorporating flanges which may be of widely diversified shapes and which are integral with the shaft to provide strength and rigidity. It is also desirable to produce such roller assemblies in a molding process which does not require deformation of a flange when the assembly is removed from the mold.

Such a process is useful because it permits a simpler molding procedure and provides extended mold life.

The mold and roller assembly of this invention meets these goals and provides a simple, integral structure which can be molded in many shapes and from a variety of materials. The roller assembly, and the process by which the assembly is formed is described in terms of an injection-molded plastic structure. It is to be understood, however, that the roller assembly is adaptable to die casting and can therefore be fabricated from metal if desired.

The improved roller assembly includes a roller having an axial opening therethrough. A shaft is disposed in the opening. A pair of flanges are disposed on opposite sides of the roller and are integral with opposite sides of the shaft. Each flange has an arcuate slot therethrough, the slot being substantially in alignment with a portion of the shaft periphery.

The arcuate slot in each flange allows a mold member to project through the flange to extend to the inner face of the other flange during the molding of the assembly. Several members can thus be inserted through the two flanges to form a hollow cylindrical shell between the flanges, the inside of the shell serving as a cavity for forming the shaft. The outside of the cylindrical shell serves to form the interior surface of the roller. The roller and shaft are thereby separated, even though formed in the same molding operation, allowing the roller to spin freely about the shaft when the cylindrical-shell members of the mold are removed.

In a preferred form of the invention, the cylindrical-shell members of the mold are shaped to form raised longitudinal ribs on the shaft surface parallel to the shaft axis. The clearance between the effective outer diameter of the shaft and the roller inner surface is thereby reduced, providing a closer running fit between these parts. In this manner, the cylindrical-shell members of the mold may be very thin, with structural strength being added by the ribbed portions on the shell which form the depressions between the ribs on the shaft.

In another form, the roller assembly may be fabricated with a web section joining the ends of the two flanges. Thus a continuous, closed structure comprising the integrally formed shaft, flanges and web is provided, with the roller cast in place around the shaft. The web section provides a convenient mounting surface for certain applications of the roller assembly. For example, the roller may be formed in the shape of a wheel, and the web section used to secure the wheel to another surface. In still another form, the roller assembly can be fabricated as a pulley. Such pulleys are inexpensive to produce and are especially useful as cord tension pulleys for draperies.

SUMMARY OF THE INVENTION

Briefly stated, the mold of this invention is adapted to cast a shaft member having integral transversely extending flanges on its opposite ends, and a movable member captively disposed around the shaft between the flanges. The mold includes a pair of spaced-apart blocks, each block having a shell extending toward the other block. The shells have inner and outer surfaces, and overlap to seat on each other so the shell inner surfaces define a shaft cavity. Each shell extends only partially around the shaft cavity in a direction normal to the shaft axis.

The mold further includes a pair of inserts which are positioned between the spaced-apart blocks and around the seated shells to define a cavity for forming a roller or other movable member between the inserts and the outer surfaces of the shells. The inserts further define a pair of transversely extending flange cavities at opposite ends of the shaft cavity. All the cavities are interconnected so a molding material injected into any cavity will flow into all the other cavities.

Preferably, the shells terminate short of the respective blocks toward which they extend to define a gap which interconnects the shaft cavity and flange cavities. Molding material flows freely through the gap to form flanges which are integrally united with the ends of the shaft member. An opening is further provided through at least one of the inserts or shells into the movable-member cavity such that molding material injected into the interconnected shaft and flange cavities also flows into the movable-member cavity.

In a form of the invention useful to mold roller assemblies, the inner surfaces of the seated shells are substantially cylindrical to define a cylindrical shaft cavity. The movable-member cavity is an annular cavity around the shell outer surfaces whereby molding material injected into the mold forms a roller positioned on a cylindrical shaft to be captive between the flanges. In one form, the inserts further define a web cavity connecting one end of the flange cavities, and the shells define a plurality of longitudinal grooves for forming ribs extending between the roller and shaft.

BRIEF DESCRIPTION OF THE DRAWINGS

These and other aspects of the invention will be explained by reference to the attached drawings, in which:

FIG. 8 is a plan view of a pulley formed in accordance with the invention;
FIG. 9 is a plan view of the opposite side of the pulley shown in FIG. 8;
FIG. 10 is a side elevation of the pulley with the frame in a closed position;
FIG. 11 is a side elevation of the pulley with the frame in an open position;
FIG. 12 is a view taken on line 12—12 of FIG. 9;
FIG. 13 is a perspective view of a mold for forming the pulley shown in FIGS. 8–12, the mold being shown in an open position;
FIG. 14 is a perspective view of the mold in a closed position;
FIG. 15 is a fragmentary cross-section taken on line 15—15 of FIG. 16, showing a portion of the mold forming the shaft cavity;
FIG. 16 is a view taken on line 16—16 of FIG. 15;
and
FIG. 17 is a cross-section of the closed mold taken on line 17—17 of FIG. 14.

DESCRIPTION OF THE PREFERRED EMBODIMENT

Figure 1:
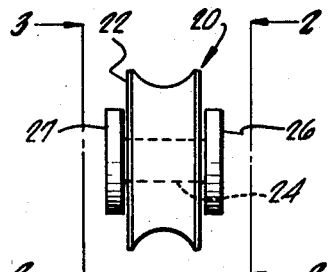
FIG. 1 is a front elevation of a roller assembly.
Figure 2:
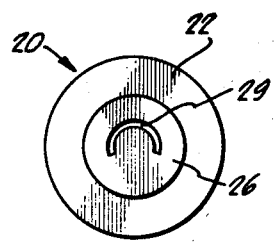
FIG. 2 is a side elevation taken on line 2—2 of FIG. 1.
Figure 3:
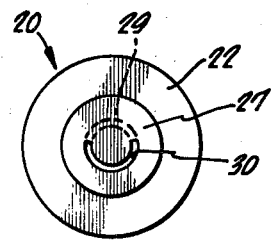
FIG. 3 is a side elevation taken on line 3—3 of FIG. 1.
Figure 4:
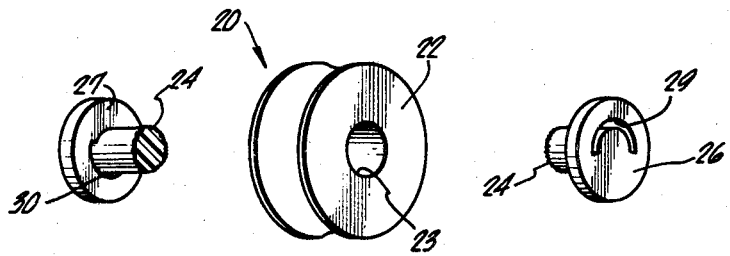
FIG. 4 is an exploded perspective view of the roller assembly.

Referring to FIGS. 1–4, a roller assembly 20 according to this invention includes a roller 22 having an axial opening 23 therethrough. A shaft 24 is disposed in the opening. Opening 23 has a larger diameter than shaft 24 such that an annular clearance space exists between the roller and shaft. A pair of flanges 26 and 27 are disposed on opposite sides of the roller. Each flange is secured to and formed integrally with the shaft.

Flange 26 has a substantially semi-circular slot 29 therethrough. Flange 27 has a similar substantially semi-circular slot 30 therethrough. Each slot is substantially in alignment with a portion of the shaft outer periphery and is centered on the axis of the shaft to be coaxial therewith. The slots are oppositely oriented to form the equivalent of an annular gap around the shaft when the assembly is viewed from the side as suggested in FIG. 3. Preferably, each slot extends slightly more than 180°, whereby the oppositely oriented slots have a slight overlap.

Figure 5:
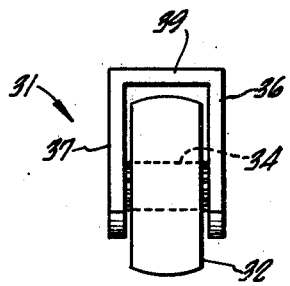
FIG. 5 is a front elevation of a roller assembly with a web section joining the flanges.
Figure 6:
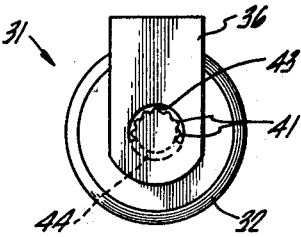
FIG. 6 is a side elevation of the roller assembly shown in FIG. 5 showing longitudinal ribs on the shaft.
Figure 7:
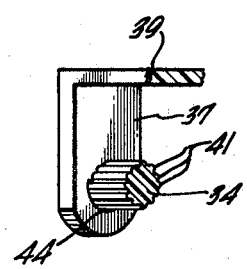
FIG. 7 is a fragmentary perspective view, partly in section, of the roller assembly shown in FIGS. 5 and 6.

Another form of the invention is shown in FIGS. 5–7. A roller assembly 31 includes a roller 32 disposed around a shaft 34. A pair of flanges 36 and 37 are disposed on opposite sides of the roller. The flanges are secured to and formed integrally with the shaft. A web 39 joins and is formed integrally with the ends of the flanges.

A multiplicity of raised longitudinal ribs 41 are disposed on the outer periphery of shaft 34. These ribs serve to reduce the clearance between the shaft and the roller to insure smooth operation, and also to allow the use of a structurally strong mold. The ribs could of course also be disposed on the inner surface of the roller to extend toward a smooth-surface shaft.

Flange 36 has a substantially semi-circular slot 43 therethrough, the slot being substantially in alignment with a portion of the shaft periphery. Flange 37 has a similar slot 44, the two slots being oppositely oriented as suggested in FIG. 6. Preferably, each slot extends slightly more than 180° whereby the oppositely oriented slots have a slight overlap.

In both of the assemblies described above, it will be noted that the roller is made captive on the shaft by the flanges. Forming of the entire roller assembly in a single molding operation is made possible by the flange slots. These slots permit introduction of thin, shell-like mold members which separate the interior of the roller from the shaft. The use of slightly overlapping slots allows the mold members to be tapered to insure easy mold separation. When the roller assembly is removed from the mold, the assembly is ready for use without any further manufacturing steps.

FIGS. 8–12 show another form of the invention wherein a roller assembly is fabricated as a pulley 50. The pulley includes a U-shaped frame 52 having a pair of spaced-apart flanges 54 and 55 joined at one end by a transverse web 57. A shaft 59 is disposed between and formed integrally with flanges 54 and 55. A roller 61 having a concave surface 62 is disposed around the shaft between the flanges.

Flange 54 has a substantially semi-circular slot 64 therethrough in substantial alignment with a portion of the periphery of shaft 59. Flange 55 has a similar semicircular slot 65 therethrough in substantial alignment with a portion of the shaft periphery. As shown in FIG. 9, the two slots are oppositely oriented whereby the entire outer periphery of the shaft is accessible through the slots in the flanges.

Shaft 59 has a concave portion 67 in each end. The function of the concave portion is to conserve the quantity of material used to mold the shaft. Shaft 59 may also be provided with raised longitudinal ribs as already suggested in FIGS. 6 and 7. For clarity of illustration, these ribs are omitted in FIGS. 8–12.

Flange 54 carries an inwardly extending button 70 on the end opposite the transverse web. A button recess 71 is defined by an inwardly extending boss 72 on flange 55 opposite the button. The button recess has a stepped bore with a first relatively short section 74 of slightly smaller diameter than the button. The remainder of the button-recess bore is an enlarged section 75 which is substantially the same diameter as the button.

A pair of inwardly extending spacers 78 and 79 are integrally formed on the inner opposing faces of the flanges between the roller and the button and buttonrecess boss. A stiffening rib 80 is integrally formed on flange 55 between the boss and spacer 79. An elongated retaining clip 81 is formed integrally at one end with the end of the boss adjacent the button. The clip extends toward but stops short of the spacers. A stop ball 82 is integrally formed on the end of the clip adjacent the spacers.

The pulley may be cast from a variety of materials but is especially suitable for molding from a plastic such as nylon. Use of the pulley as a drapery cord tension pulley will now be described, although it is to be understood that the pulley has many other applications.

With the button end of the U-shaped frame open as shown in FIG. 11, a drapery pull cord 85 (shown in phantom) is slipped between the button and button-recess boss to pass between spacers 78 and 79 to seat on the concave surface of roller 61. The loop of a retaining spring 87 (shown in phantom) is then slipped between the button and button-retaining boss to pass around the retaining clip to seat on the boss.

The cord and spring are locked in place by squeezing together the flanges to force the button into the button-retaining recess. This closed position of the pulley asembly is illustrated in FIG. 10, which also shows how the spacers 78 and 79 abut each other to maintain the flanges in a spaced-apart condition, preventing binding of the roller on the flanges. The pulley assembly is thus locked in place and ready for service in the drapery-cord system.

The invention is not restricted to the three roller-assembly configurations described above. Many other configurations may be made in accordance with the invention. For example, the roller surface may be of any convenient curvature and the flanges may be formed to provide a variety of convenient mounting methods. The provision of slots in the flanges in substantial alignment with the shaft surface permits the roller assembly to be molded or cast in a single operation.

A mold 90 suitable for forming the pulley assembly just described is illustrated in FIGS. 13–17. The mold is shown in an open position (for ejecting a finished pulley assembly) in FIG. 13, and in a closed position (ready for forming a pulley assembly) in FIG. 14. The mold includes a base block 92, a cover block 93, and a pair of inserts 95 and 96. Arrows 98 show how the base block, cover block, and inserts move toward each other from the closed position.

Base block 92 has a circular opening 100 therethrough, best seen in FIGS. 15 and 17. A thin, semi-cylindrical hollow shell 102 is secured to the base block adjacent the periphery of the hole 100, and extends toward cover block 93. The shell has two longitudinally extending edges 103 which are tapered as shown in FIG. 15 to insure easy mold separation. A second thin, semi-cylindrical hollow shell 105 is secured to the cover block and extends toward the base block. Shell 105 has two longitudinally extending edges 106 which are tapered to match the taper on edges 103.

FIG. 15 shows how the two shells seat on one another when the mold is in a closed position (inserts 95 and 96 are deleted in FIG. 15 for clarity). Edges 103 and 106 fit snugly against each other, the two shells thus forming a continuous cylindrical shell 108 as best seen in FIG. 16. The interior of cylindrical shell 108 forms a shaft cavity 109. The exterior of cylindrical shell 108 defines the inner surface of a movable-member cavity or roller cavity 110 as best seen in FIG. 17.

As shown in FIGS. 13, 15 and 16 (but deleted in FIG. 17 for clarity), the inner surfaces of shells 102 and 105 define a plurality of longitudinal grooves 111 for forming ribs on the shaft surface. The grooves could be relocated on the outer surface of the shell if it is desired to form ribs on the inner surface of the roller for rotation around a smooth-surface shaft.

When the mold is in a closed position, the end of shell 102 stops short of cover block 93 to define a gap 112 as shown in FIG. 15. Similarly, shell 105 stops short of base block 92 to define a gap 113. These gaps permit free flow of plastic through the mold whereby the roller-assembly flanges and shaft are formed as an integral structure.

The base block has a recessed wall 115 around the base of shell 102. This recessed wall defines one side of a first flange cavity 116. The cover block has a recessed wall 118 around the base of shell 105. Recessed wall 118 defines one side of a second flange cavity 119. The two flange cavities are best seen in FIG. 17.

Inserts 95 and 96 have recessed walls 121 in the surfaces which face the base block. Recessed walls 121 form a second wall of first flange cavity 116. The opposite faces of inserts 95 and 96 which face the cover block have recessed walls 122. Recessed walls 122 form a second flange cavity 119.

The abutting edges of inserts 95 and 96 include semi-circular recesses whereby the blocks fit together snugly around assembled cylindrical shell 108 to form an annular wall 125 which defines the outer surface of roller cavity 110. The annular wall is inwardly convex to form the concave surface of the pulley roller. Recessed wall 121 of insert 95 has several small openings 127 whereby fluid plastic may flow from flange cavity 116 into the roller cavity during the molding operation.

A hollow, close-fitting ejection sleeve 129 is slidably disposed in opening 100 of base block 92. A first stationary core 131 makes a close fit within ejection sleeve 129. The stationary core has a rounded end which extends slightly beyond the inner end of the ejection sleeve. A second stationary core 132 with a rounded end is secured to and extends from the inner face of cover block 93. The cores (best seen in FIGS. 13 and 17, and omitted in FIGS. 15 and 16 for clarity) extend into shaft cavity 109 to define the concave shaft ends in the molded pulley assembly.

The two inserts are recessed to form a web cavity 135 which connects the flange cavities 116 and 119. The inserts are also recessed to form a button cavity 137, a boss cavity 138, a clip and stop-ball cavity 139, a stiffening rib cavity 140, and a pair of spacer cavities 141. A hollow, close-fitting ejection sleeve 142 is slidably disposed in a hole through base block 92 in alignment with the boss cavity. A necked-down stationary core 143 is disposed within and extends beyond ejection sleeve 142 to define the inner surface of the boss cavity.

A filling cavity 145 is defined by the abutting inserts, and is in alignment with a filling passageway 146 in the cover block and an ejection pin 148 slidably disposed through the base block. A slanted, tapered portion of filling cavity 145 is in communication with web cavity 135.

To cast a pulley assembly, the mold is assembled in a closed position as shown in FIG. 14, and a source of fluid plastic is connected to filling passageway 146. The mold would typically be mounted on an injection molding machine (not shown) which would automatically position the several mold blocks, inserts, stationary cores and the ejection pin and sleeves.

Plastic is then injected through the filling passageway into the web and flange cavities. The fluid plastic circulates through the flange cavities to fill all the other cavities in the mold. Holes 127 provide an entrance for the fluid plastic from flange cavity 116 into the roller cavity.

When the plastic has solidified, cover block 93 is backed away from the mold, and ejection pin 148 is moved to eject the "flash" material which has formed in filling cavity 145. The "flash" material is severed from the web portion of the molded pulley by this operation. Inserts 95 and 96 are then moved away from each other to expose the completed pulley. As insert 95 is moved, the slender threads of "flash" material extending through holes 127 are severed, permitting the roller to move freely around the pulley shaft.

Ejection sleeves 129 and 142 are then moved through the base block, forcing the completed pulley assembly out of the mold. The base block, cover block and inserts may then be moved together to place the mold in a closed position in readiness for the next molding operation.

While the mold just described is designed for production of pulley assemblies, it is to be understood that the invention is not restricted to this specific mold. The general principles of the invention may be incorporated in many different styles of molds which would be used to produce the various forms of roller assemblies already described, as well as other types of assemblies in which a movable member is rotatable or otherwise movable on a shaft.

What is claimed is:

1. A mold for casting a shaft member having integral transversely extending flanges on each end and a movable member disposed around the shaft between the flanges, the mold comprising:

a pair of spaced-apart blocks, each block having a shell extending toward the other block, the shells having inner and outer surfaces and being overlapping and seating on each other so the shell inner surfaces define a shaft cavity, each shell extending only partially around the shaft cavity; and a pair of inserts disposed between the spaced-apart blocks and around the seated shells to define a movable-member cavity between the inserts and the shell outer surfaces, and to define a pair of transversely extending flange cavities at opposite ends of the shaft cavity; the shaft cavity, movable-member cavity and flange cavities being interconnected whereby a molding material injected into any cavity will flow into all other cavities.

2. The mold defined in claim 1 in which each shell terminates short of the block toward which it extends to define a gap which interconnects the shaft cavity and one of the flange cavities whereby the molding material forms flanges which are integrally united with the ends of the shaft member.

3. The mold defined in claim 2 in which at least one of the inserts and shells defines an opening therethrough into the movable-members cavity whereby molding material injected into the interconnected shaft and flange cavities also flows into the movable-member cavity.

4. The mold defined in claim 3 in which the inserts further define a web cavity connecting one end of the flange cavities.

5. The mold defined in claim 3 in which the shells define a plurality of longitudinal grooves for forming ribs extending from one of the members toward the other member.

6. The mold defined in claim 3 in which the inner surfaces of the seated shells are substantially cylindrical to define a substantially cylindrical shaft cavity, and the movable-member cavity is an annular cavity whereby molding material injected into the mold forms a roller positioned on a cylindrical shaft to be captive between the flanges.

7. The mold defined in claim 6 in which the inserts further define a web cavity connecting one end of the flange cavities, and the shells define a plurality of longitudinal grooves for forming ribs extending between the roller and shaft.

References Cited

UNITED STATES PATENTS

| 2,307,874 | 1/1943 | Bilde. | |
| 3,108,329 | 10/1963 | Chapman | 249—61 X |
| 3,362,675 | 1/1968 | Ferdig | 249—160 X |
| 3,424,483 | 1/1969 | Harrison | 249—142 X |

J. HOWARD FLINT, JR., Primary Examiner

U.S. Cl. X.R.

249—129, 142, 160

PO-1050
(5/69)

UNITED STATES PATENT OFFICE
CERTIFICATE OF CORRECTION

Patent No. 3,496,611   Dated February 24, 1970

Inventor(s) Earl W. Ferdig

It is certified that error appears in the above-identified patent and that said Letters Patent are hereby corrected as shown below:

Column 5, line 40, "the closed position" should read --the open to closed position. Column 6, line 10, "form a second flange" should read --form a second wall of second flange--. Column 8, line 2, claim 3, "movable-members" should read --movable-member--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents